3,849,337
PROCESS FOR THE PREPARATION OF OXIDATION CATALYSTS AND CATALYSTS OBTAINED THEREBY
Giovanni Manara and Vittorio Fattore, San Donato Milanese, Italy, assignors to Snam Progetti, S.p.A., San Donato Milanese, Italy
No Drawing. Filed Apr. 21, 1972, Ser. No. 246,440
Claims priority, application Italy, Apr. 23, 1971, 23,548/71
Int. Cl. B01j 11/06, 11/08, 11/22
U.S. Cl. 252—439                              7 Claims

ABSTRACT OF THE DISCLOSURE

Improved oxidative catalysts comprising an antimony compound in combination with a compound of a second metal, e.g., iron, uranium, etc., are prepared by forming a dry powder of the compounds, adding a compound such as ammonium carbonate, ammonium bicarbonate, urea, hexamethylenetetramine or oxalic acid, which is volatile at temperatures lower than the catalyst activation temperature, molding the mass to shape and heating the mass to activate the catalyst and to eliminate the volatile compound.

---

The present invention relates to a process for the preparation of oxidation catalysts and more particularly to oxygen containing compounds of antimony and a second metal base improved catalysts.

Oxidation catalysts are known based on oxygen containing compounds of antimony and a second metal generally selected among iron, uranium, tin, cerium, manganese, thorium, also containing possible modifiers.

They are employed in oxidation catalytic reactions, as the oxidation of hydrocarbons to aldehydes and acids, the oxidative dehydrogenation of olefins to diene compounds, and the conversion of alpha-olefins, containing from 3 to 6 carbon atoms, into the corresponding unsaturated nitriles in presence of ammonia and an oxygen containing gas.

It has now been found that the catalytic performances of these catalysts may be improved by adding a volatile compound during the preparation thereof according to the process of the present invention.

Particularly in the fixed bed processes, during the usual methods for obtaining such catalysts, after the drying phase, the volatile compound is added to the dust, before it is moulded according to the usual employment shapes, for instance before the extrusion or the pressing.

The addition of the aforesaid compound changes the total porosity of the catalyst and the distribution spectrum of the pores; furthermore it gives rise to various crystallite sizes during the activation phases of the catalytic mass. The improvements of the catalyst performances may be attributed to the change of the aforesaid properties.

In order to perform the inventive process, a use may be made of all the compounds which are volatile at temperatures lower than the activation temperature of the catalyst and therefore do not react with same and do not modify the chemical composition thereof. For instance an advantageous use may be made of ammonium carbonate or bicarbonate urea, hexamethylenetetramine, oxalic acid and so on. The antimony oxy-compounds base catalysts may be prepared according to the usual methods, but the addition of the volatile compound has to be carried out on the dried catalytic mass, before the moulding and the activation.

The preparation of the catalyst may be carried out by employing starting materials constituted by the components in their elementary state or derivatives thereof; they are subjected to suitable chemical or thermal treatments so as to obtain catalytic compositions containing the various components in the most right atomic ratio and chemical combination. The derivatives more usually employed are oxides, hydroxides and salts from mineral or organic acids.

The usually employed preparation methods provide operation well known to the skilled in the art as impregnation, coprecipitation, drying, atomization and calcination. Generally the ratios of the fundamental components of the catalysts are not critical. The atomic ratio between antimony and the second metal of the catalyst may range between 90 to 1 and 1 to 90, and preferably between 10 to 1 and 1 to 10.

A fixed amount of the voaltile compound, selected from the aforesaid ones, is added to the powdered mass obtained by means of some of the cited treatments after the heating phase. This latter is carried out between 180 and 300° C. in order to evaporate and remove possible residual products as, for instance, water.

The volatile compound has to be added in such an amount that the catalysts do not lose any mechanical resistance when recovered in the final utilization form. The amount of the added compound is generally ranging from 2% and 50% by weight with respect to the catalyst weight, and preferably between 10% and 30%. The finely dispersed catalytic mass and the volatile compound are intimately mixed up to obtain a mixture having a homogeneous composition. The subsequent phases of the catalyst preparation are not critical and are well known to the skilled in the art.

The obtained mass is mixed with suitable lubricants as stearine, graphite dust, magnesium silicate and so on, and then moulded by pressing, extrusion or granulation into the usual shapes and sizes of catalyst employed in the fixed bed processes. Then the catalyst is slowly heated up to the complete elimination of the added compound and the lubricant. The temperature is then quickly raised to the predetermined value in order to obtain the final activation of the catalyst.

According to the known art a catalyst having a higher catalytic activity may be prepared by adding some promoters. The amount of this latter is not critical and may range from 0.1 to 10% by weight with respect to the catalyst weight. Then the activity may be furthermore increased by working according to the process of the present invention.

An advantageous use may be made of the promoters selected from the oxycompounds of one of the following elements: As, Ag, Bi, Co, Mo, Ni, Nb, Pb, Re, Te, Ti, W, Zn, Ce, Fe, Mn, Sn, Th and U. These promoters may be added during the preparation of the catalyst, or after the moulding hereof. The promoter may be added as salt, acid, or any compound which is thermally decomposable in situ till to form the desired residual compound. After such an impregnation the catalyst is dried and calcined at temperatures next to the activation ones.

The inventive catalysts are very useful for the catalytic oxidation of olefins to oxygenated products, for the oxidative dehydrogenation to diolefins and for ammoxidation reactions of olefins.

The advantages of the inventive catalysts will be pointed out by the following unrestrictive examples, which illustrate the invention itself. Hereinafter the terms "conversion" and "selectivity" are to be intended according to the following definitions:

$$\text{Conversion} = \frac{\text{Reacted propylene, moles}}{\text{Fed propylene, moles}} \cdot 100$$

$$\text{Selectivity} = \frac{\text{Obtained acrylonitrile, moles}}{\text{Reacted acrylonitrile, moles}} \cdot 100$$

EXAMPLES 1 AND 2

1650 g. of iron nitrate [$Fe(NO_3)_3 \cdot 9H_2O$] were heated at 80° C. in a steel reactor and then, under stirring, 1800 g. of antimony oxide ($Sb_2O_3$) were slowly added. The heating was protracted up to 250° C. in order to evaporate water and decompose the present nitrates. A little powder was obtained of the magnitude order of microns. The mass was intimately mixed with 70 g. of stearic acid. One portion was then pressed into little cylinders having a 4 mm. diameter and a 5 mm. length. On the contrary the other one was extruded into little cylinders having a 3 mm. diameter and a 5 mm. length. The catalysts were put in a muffle and the temperature was regularly raised to 500° C. in 20 hours. The catalysts were kept at this temperature for 2 hours and then at 800° C. for 3 hours.

The two catalysts, activated as aforesaid, were separately charged in tubular reactors having one inch internal diameter and one mm. length, and plunged in a mercury heating bath. At a mean temperature of the catalytic bed equal to 450° C., a propylene spatial rate of 30N cc./h., a $C_3H_6/Air/NH_3/H_2O$ feeding molar ratio equal to 1/12/1.2/15 it was possible to obtain a propylene conversion equal to 85% and a selectivity to acrylonitrile equal to 65% by employing the pressed catalyst, and an 80% conversion and a 63% selectivity by using the extruded catalyst.

EXAMPLES 3 AND 4

A catalyst was prepared according to the procedure and by employing the same quantities of Examples 1 and 2, but the mass was mixed with 450 g. of ammonium bicarbonate before carrying out the pressing or the extrusion. The one portion was pressed and another one was extruded. These operations and the activation were carried out according to the preceding examples.

At the same experimental conditions of Examples 1 and 2 of the propylene ammoxidation reaction the following results were obtained:

| N | Catalyst | Conversion by moles, percent | Selectivity to acrylonitrile by moles, percent |
|---|---|---|---|
| 3 | Pressed | 85 | 71 |
| 4 | Extruded | 82 | 70 |

EXAMPLE 5

A catalyst was prepared according to Examples 3 and 4, but the bicarbonate was replaced by 450 g. of urea and the catalyst was pressed.

At the same experimental conditions of Examples 1 and 2 the following results were obtained:

|  | Percent |
|---|---|
| Propylene conversion | 78 |
| Selectivity to acrylonitrile | 70 |

What we claim is:

1. A process for the preparation of oxidation catalyst based on oxides of antimony and of a second metal selected from the group consisting of iron, uranium, tin, cerium, manganese and thorium said process comprising (i) providing a powdered catalytic mass by heating compounds of the said metals which are thermally decomposable to the metal oxides, (ii) drying the finely powdered catalytic mass; (iii) adding a compound, volatile at temperatures lower than the catalyst activation temperature, and selected from the group consisting of ammonium carbonate, ammonium bicarbonate, urea, hexamethylenetetramine and oxalic acid, (iv) molding the catalyst preparation to shape, (v) heating the shaped catalyst until said volatile compound is completely eliminated and (vi) then calcining to obtain the oxides of the said metals.

2. A process for the preparation of oxidation catalyst based on oxides of antimony and a second metal selected from the group consisting of iron, uranium, tin, cerium, manganese and thorium at atomic ratios between antimony and the second metal ranging from 90 to 1 to 1 to 90, said process comprising (i) providing a powdered catalytic mass by heating compounds of the said metals which are thermally decomposable to the metal oxides, (ii) drying by heating at a temperature of 180 and 300° C. the finely powdered catalytic mass, (iii) adding a compound, volatile at temperatures lower than the catalyst activation temperature, and selected from the group consisting of ammonium carbonate, ammonium bicarbonate, urea, hexamethylenetetramine and oxalic acid in an amount of from 2 to 50% by weight with respect to the catalyst weight, (iv) molding the catalyst preparation to shape, (v) heating the shaped catalyst until said volatile compound is completely eliminated and (vi) then calcining to obtain the oxides of said metals.

3. A process for the preparation of oxidation catalysts as defined in Claim 1 which also includes the step of adding a compound which is thermally decomposable to a promoting metal oxide for said catalyst selected from the group consisting of oxycompounds of one of the following elements: As, Ag, Bi, Co, Mo, Ni, Nb, Pb, Re, Te, Ti, W and Zn in an amount ranging from 0.1 to 10% by weight with respect to the catalyst weight.

4. A process according to Claim 3 in which the volatile compound added is ammonium bicarbonate.

5. A process according to Claim 3 in which the volatile compound added is urea.

6. A process according to Claim 1 in which said atomic ratios between antimony and the second metal range from 10 to 1 to 1 to 10.

7. A process according to Claim 1 wherein said volatile compound is added in an amount ranging between 10 and 30%, by weight with respect to the catalyst weight.

References Cited

UNITED STATES PATENTS

| | | | |
|---|---|---|---|
| 3,346,513 | 10/1967 | Hadley | 252—461 |
| 3,346,659 | 10/1967 | Barclay et al. | 252—461 X |
| 3,627,817 | 12/1971 | Barnett et al. | 260—465.3 |
| 3,326,819 | 6/1967 | Newman | 252—461 |
| 3,338,952 | 8/1967 | Callahan et al. | 252—456 X |
| 3,431,292 | 3/1969 | Callahan et al. | 252—456 X |

FOREIGN PATENTS 622,025   3/1963   Belgium _____ 252—461

PATRICK P. GARVIN, Primary Examiner

W. J. SHINE, Assistant Examiner

U.S. Cl. X.R.

252—461, 462, 467, 468, 469, 470, 471, 472, 473, 474, 475, 476; 260—465.3

UNITED STATES PATENT AND TRADEMARK OFFICE
CERTIFICATE OF CORRECTION

PATENT NO. : 3,849,337
DATED : November 19, 1974
INVENTOR(S) : Giovanni Manara and Vittorio Fattore It is certified that error appears in the above—identified patent and that said Letters Patent are hereby corrected as shown below:

Correct the title to read, --PROCESS FOR THE PREPARATION OF OXIDATION CATALYSTS--

Column 4, line 16, after "of" insert --between--

Signed and Sealed this

Third Day of August 1976

[SEAL]

Attest:

RUTH C. MASON
Attesting Officer

C. MARSHALL DANN
Commissioner of Patents and Trademarks